Patented July 31, 1934

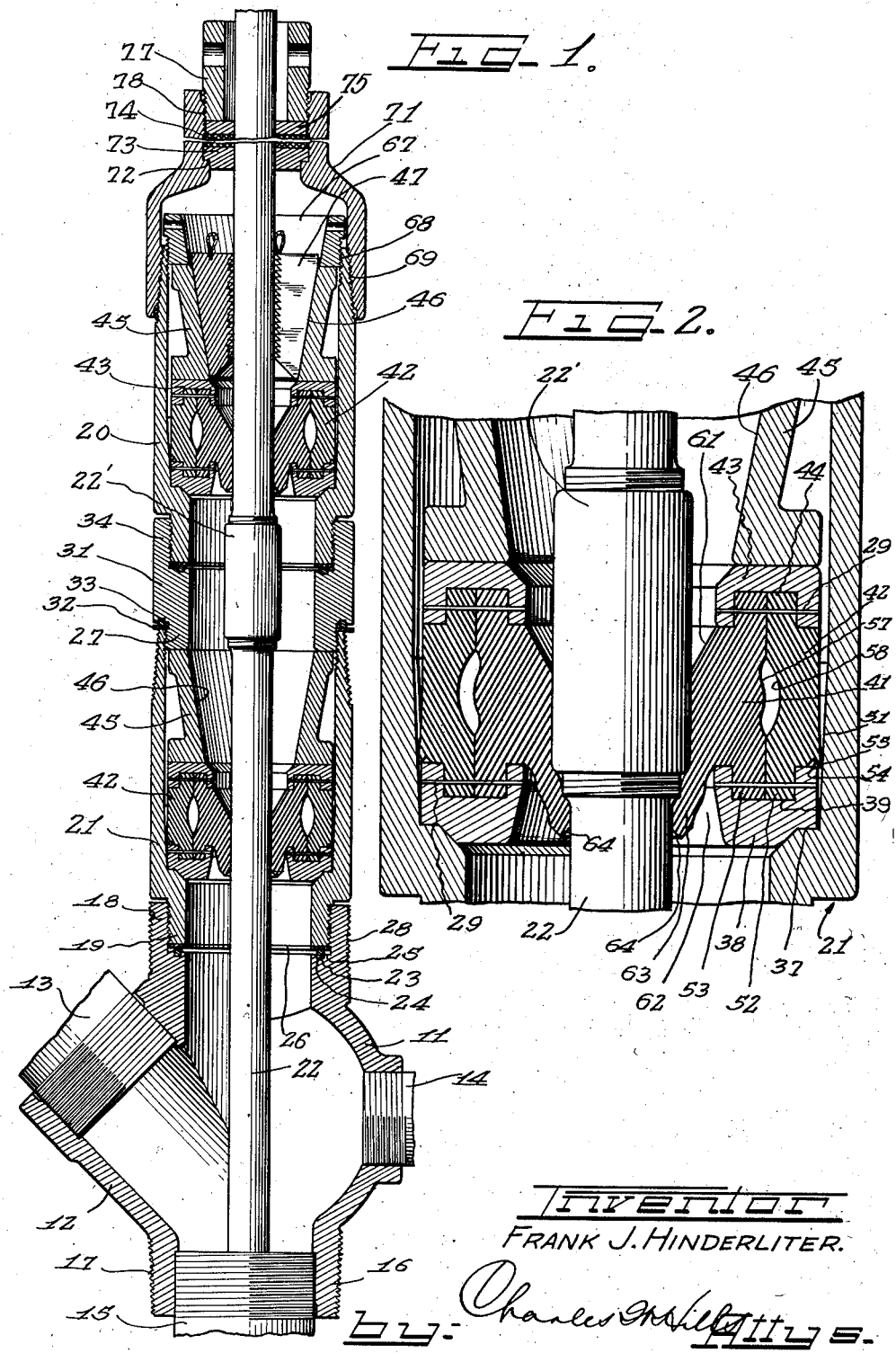

1,968,685

UNITED STATES PATENT OFFICE 1,968,685

CASING HEAD

Frank J. Hinderliter, Tulsa, Okla.

Application June 21, 1933, Serial No. 676,801

6 Claims. (Cl. 166—14)

This invention relates to a casing head and will be described as a casing head incorporating high pressure sealing means therein for effectively preventing the escape of oil or other fluid upwardly along the well casing or drill pipe which normally extends vertically through the casing head.

Another object is the provision of an improved casing head in combination with a plurality of packing assemblies, so designed and arranged that greatly increased pressures will be sustained thereby.

A further object of this invention is the provision of such a casing head with a plurality of packing assemblies, there being means associated with one of the packing assemblies whereby the weight of a casing or drill pipe passing through the packing assembly may be transferred to and supported by the packing assembly, and means whereby a predetermined pressure may be exerted upon the other packing assembly for adjustably forcing it into contact with the side wall of the pipe for insuring the packing off of fluid under pressure within the casing head.

A further object is the provision of such a casing head with a plurality of packing assemblies, one superposed with respect to the other, and so spaced that upon the lowering of a pipe through the casing head, one of the packing assemblies will tightly engage the side wall of the main body of the pipe, while the collar connecting two lengths of pipe is passing through the other packing assembly, thus insuring positive and continuous contact with the surface of the pipe by one or the other of the packing assemblies at all times.

Other objects and advantages of this invention will become apparent from the following detailed description with reference to the accompanying drawing.

On the drawing:

Figure 1 is a vertical section through a casing head incorporating my invention, some of the parts being shown in elevation.

Figure 2 is an enlarged fragmentary section illustrating a portion of that shown in Figure 1 more in detail, and illustrating the action of the packing assembly as a collar connecting two lengths of pipe passes through the same.

As shown on the drawing:

The preferred form of my invention is illustrated in the drawing and comprises a casing head including a head or globe portion 11 having a relatively large somewhat globular interior and a takeoff 12 on one side of relatively large diameter which forms a Y with the casing. The portion 12 is internally threaded at its outer end for receiving therein a pipe 13 inclined at a relatively steep angle for delivering fluid from the head 11 to any desired point with a minimum of friction within the head. At the opposite side of the globe portion 11, a pipe 14 has threaded engagement therewith and extends horizontally therefrom through which fluid may be delivered to any desired point. The lower end of the head 11 is adapted for threaded engagement with a casing 15 which may extend into a well not shown. The exterior of the boss 16 is provided with casing threads 17 by which the head may be secured into a casing of larger diameter than that shown in the drawing. The upper end of the head 11 is provided with a boss 18 having threaded engagement with the lower end portion 19 of a vertically disposed extension or bowl member 21 which is provided for surrounding the drill pipe 22 extending vertically therethrough and for supporting a packing assembly therein.

For sealing the boss 19 to the head 11, there is provided a relatively soft ring 23, preferably formed of metal, such as lead, seated in a groove 24 on the face of the shoulder 25. A flat metal gasket 26 is interposed between the ring 23 and the lower end of the boss 19 to form a fluid-tight seal therewith to prevent loss of pressure at this point. On the outside of the depending boss 18, casing threads 28 are provided by which it is possible to make connection with a pipe of larger diameter than that of the boss 19 of the bowl 21 in case the bowl is not employed.

The vertical extension or casing head bowl 21 is provided with an annular internal shoulder 37 on which is seated a packing assembly consisting of a metal ring 38 having a channel 39 in its upper surface and in which is seated the inner and outer annular rubber sealing members 41 and 42 respectively. An upper metal ring 43 having a downwardly disposed channel 44 is fitted on the upper edges of the packing members 41 and 42.

Seated upon the metal ring 43 is a bushing 45 having a tapered or frusto conical shaped inner cam surface 46 which is larger in diameter adjacent the top. On the upper edge of the bushing 45 is seated the lower end 27 of a coupler 31 which, by reason of threaded engagement with the inner surface of the bowl 21 adjacent its upper edge, pressure is exerted upon the bushing 45 for causing displacement or flowing of the rubber in the sealing members 41 and 42 for forcing them tightly against the outer surface of the pipe 22. The degree of this force may be readily adjusted by rotation of the coupler 31 relative to the bowl 21. Suitable sealing gaskets 32 and 33 are disposed between the upper end of the bowl 21 and a downwardly disposed shoulder on the coupler 31. The upper end of the coupler 31 is provided with a boss 34 having threaded engagement with the lower end of a bowl 20 which is similar to the bowl 21 but is disposed thereabove in vertical alignment with and for the purpose of receiving and supporting a second packing assembly which is of identical construction with that already described.

Seated upon the metal ring 43 of the upper packing assembly is disposed a second bushing 45 having a cam surface 46 upon which may be positioned slips or wedges 47 which engage the pipe 22 and are adapted to hold the weight thereof. The weight of the pipe 22 being supported by the wedges 47 is transferred to the upper bushing 45 and to the metal ring 43 which depresses the rubber packing members 41 and 42, displacing portions of the rubber thereof laterally to form a fluid-tight seal between the pipe and the inner surface of the bowl 20. The bowls 20 and 21, being of identical construction, need not each be described with relation to the operation of the packing assembly. In Figure 2 is illustrated in considerable detail the construction of the bowls, the one illustrated being designated by numeral 21. The lower portion of the inner surface of the bowl is slightly tapered downwardly and inwardly to the shoulder 37 such that when the outer rubber sealing member 42 is pressed into position from above, the lower edge of the sealing member 42 is crowded against the tapered inner surface 51 which facilitates the forming of a tight seal at this point. The sealing members 41 and 42 have annular ridges 52 and 53 thereon which fit within the channel portions of the rings 38 and 43. The lower edge of the outer packing member 42 is provided with a groove 54 preferably of V-shape adjacent the outer edge in a position to provide a relatively sharp downwardly extending flange 55 which extends slightly beyond the outer edge of the ring 38 and into firm engagement with the surface 51 of the bowl to form therewith a fluid-tight and relatively high pressure seal. The packing assembly is preferably held together by suitable pins 29 passing through the rings 38 and 43 and through the annular ridges 52 and 53 on the packing elements.

The co-engaging surfaces of the rubber packing members 41 and 42 are provided with opposed grooves 57 and 58 which provide space for the displacement of rubber thereinto when a drill pipe 22 is inserted through the packing assembly together with the collar 22' thereon as shown in Figure 2.

The inner packing ring 41 is provided with a bevelled upper corner 61 to facilitate the downward movement of the pipe therethrough. The lower surface of the packing member 41 is provided with a pocket 62 into which fluid under pressure may pass to firmly press the depending flange 63 on the inner lower edge of the member 41 into firm engagement with the pipe 22. The lower edge of the flange 63 has a bevelled edge 64 forming, in effect, an outward flaring of the flange 63 at the lower edge to facilitate the upward movement of the pipe 22 therethrough together with the collar 22' thereon.

Above the upper bushing 45 and resting on the same is an adjustable bushing 67 having threaded engagement at 68 with interior threads on the upper end of the bowl 20. The upper end of the bowl 20 is provided with external threads having engagement at 69 with internal threads on the packing gland casing 71. The casing 71 is provided with a shoulder 72 on which is seated a ring 73 for holding a packing gland seal 74. On the top of the seal 74 is seated a ring 75 on which is disposed an adjustable packing gland nut 77 having threaded engagement at 78 with internal threads on the upper end of the casing 71. The nut 77 may be split if desired so that it may be readily placed in position without passing it over the end of the pipe.

In Figure 2 is more particularly illustrated the manner of operation of the packing assembly during the raising and lowering of a pipe in a well by passing it longitudinally through the casing head and simultaneously maintaining a radial force of the packing member 41 against the pipe 22 so that a fluid-tight seal is maintained even when the collar 22' is passing through the packing. By referring to Figure 1 it will be noted that as the collar 22' passes through one of the packing assemblies, the other packing assembly has firm engagement directly with the outer surface of the pipe 22, because of the fact that the packing assemblies are spaced apart a sufficient distance to permit the collar 22' to clear one of the packing assemblies before it enters the other packing assembly. This combination and arrangement makes it practically impossible for fluid pressure to escape upwardly along the pipe 22 regardless of the position of the collar 22'.

The advantages of this invention have already become well known in the oil industry. The invention has proven to be a very important one in that it affords a solution to the problem of oil well operators with regard to the holding of the fluid pressure in the well so that sudden outbursts of fluid such as gas, salt water, oil, and the like will not result in damage to the surrounding property. For example, if, in the drilling of a well, oil should be suddenly forced through the casing head and discharged upon the surrounding property, litigation for damage ensuing as a result of the spraying of the land with oil and thus rendering it useless for agricultural purposes, is a great expense to oil well drillers. Much of the same conditions would result from the discharge of other fluids into the atmosphere and upon the land surrounding the well being operated.

Heretofore it has been exceedingly difficult to harness such sudden outbursts of fluid. This invention not only affords a solution to this problem, but it has met with great success commercially in the oil field. Through the use of this invention it is possible, at all times, to have the well under complete control, so that should a sudden outburst of fluid occur, the same may be controlled and delivered to suitable receptacles for accommodating the same, or discharged in such a manner that it will not, in any way, injure the surrounding property.

Although I have herein described only one preferred form of my invention, it will be understood that many changes may be made and numerous details of construction may be varied without departing from the principle of this invention and accordingly I desire that the patent to be granted hereon shall not be limited in any manner except as necessitated by the prior art and the scope of the appended claims.

I claim as my invention:

1. In a casing head, two vertically disposed bowls operably connected in alignment one above the other for surrounding a pipe passing therethrough, a packing assembly in each of said bowls adapted to form a high pressure seal with the pipe and the inner surface of the bowls, and means for sustaining the weight of the pipe and transferring it to one of said packing assemblies to increase the pressure of the seal, and means for adjustably varying the pressure of each seal as unaffected by the weight of the pipe, said packing assemblies being spaced apart vertically a sufficient distance to permit a collar connecting two adjacent lengths of pipe to pass through and completely clear one packing assembly before entering the other packing assembly.

2. In a casing head, an upper sealing zone including sealing means for disposition around pipe extending through said casing and comprising a ring having its internal surface urged into engagement with said pipe and formed to yield radially from and toward the pipe as the pipe and its couplings are passed through the casing head so as to continuously maintain a fluid tight seal about the pipe and a lower sealing zone including a similar sealing means and spaced from the upper zone a distance in excess of the length of a pipe coupling so that while a coupling is being passed through one zone the sealing means of the other zone is continuously in sealing engagement with the pipe, the sealing means of each zone comprising concentric rubber sleeves the inner sleeve of which is provided with a downwardly and inwardly extending flange.

3. In a casing head, an upper sealing zone including sealing means for disposition around pipe extending through said casing and comprising a ring having its internal surface urged into engagement with said pipe and formed to yield radially from and toward the pipe as the pipe and its couplings are passed through the casing head so as to continuously maintain a fluid tight seal about the pipe and a lower sealing zone including a similar sealing means and spaced from the upper zone a distance in excess of the length of a pipe coupling so that while a coupling is being passed through one zone the sealing means of the other zone is continuously in sealing engagement with the pipe, the sealing means of each zone comprising a hollow rubber ring formed to yield internally as a pipe coupling is passed through the ring.

4. In a casing head, a body portion, sealing means in said portion and comprising a packing ring having its inner surface urged into engagement with a pipe passing therethrough, and being provided with a downwardly and inwardly extending flange urged into engagement with said pipe by pressure from below, a second and similar sealing means disposed above the first said sealing means a distance greater than the length of a coupling joining two sections of said pipe, whereby each of said sealing means is responsive to pressure from below to form themselves inwardly around the edges of a coupling as the same is introduced thereinto and means for forming a sealed chamber between the spaced sealing means.

5. In a casing head, a plurality of zones of sealing means spaced apart a distance greater than the length of a coupling joining two sections of pipe passing through said casing head, each sealing means comprising a packing ring normally urged into intimate contact with said pipe, adjustable means individual to each sealing means for varying the pressure of the sealing means against said pipe, and each of said packing rings having an angularly disposed flange thereon extending downwardly and inwardly in position to be urged inwardly against said pipe by pressure from below.

6. In a casing head, a plurality of zones of sealing means spaced apart a distance greater than the length of a coupling joining two sections of pipe passing through said casing head, means for supporting said sealing means in position, each said sealing means comprising a packing ring normally urged into contact with said pipe and having an angularly disposed flange thereon extending below the supporting surface of its respective supporting means and inwardly from the supporting means into position to be urged into engagement with said pipe by pressure from below, adjustable means associated with each said sealing means for varying the pressure of the sealing means against said pipe, and supporting means for said pipe arranged to transfer the weight thereof to one of said sealing means.

FRANK J. HINDERLITER.